United States Patent
Seo et al.

(10) Patent No.: US 11,840,611 B2
(45) Date of Patent: Dec. 12, 2023

(54) POLYAMIDE-BASED COMPOSITE FILM AND DISPLAY DEVICE COMPRISING SAME

(71) Applicants: SK microworks Co., Ltd., Gyeonggi-do (KR); SK microworks solutions Co., Ltd., Chungcheongnam-do (KR)

(72) Inventors: Yun Hee Seo, Chungcheongnam-do (KR); Sang Hun Choi, Gyeonggi-do (KR); Jin Woo Lee, Gyeonggi-do (KR); Jung Hee Ki, Gyeonggi-do (KR); Dae Seong Oh, Gyeonggi-do (KR); Han Jun Kim, Gyeonggi-do (KR); Sun Hwan Kim, Gyeonggi-do (KR)

(73) Assignees: SK Microworks Solutions Co., LTD., Chungcheongman-do (KR); SK Microworks Co., LTD., Gyeonggi-do Republic of (KR)

( * ) Notice: Subject to any disclaimer, the term of this patent is extended or adjusted under 35 U.S.C. 154(b) by 246 days.

(21) Appl. No.: 17/407,779

(22) Filed: Aug. 20, 2021

(65) Prior Publication Data
US 2022/0073689 A1     Mar. 10, 2022

(30) Foreign Application Priority Data
Sep. 4, 2020     (KR) .................. 10-2020-0112924

(51) Int. Cl.
*C08J 5/18*     (2006.01)
*C08G 69/28*   (2006.01)
*C08K 3/36*    (2006.01)

(52) U.S. Cl.
CPC ............. *C08J 5/18* (2013.01); *C08G 69/28* (2013.01); *C08K 3/36* (2013.01); *C08J 2377/10* (2013.01)

(58) Field of Classification Search
None
See application file for complete search history.

(56) References Cited

U.S. PATENT DOCUMENTS

2005/0227024 A1* 10/2005 Shimomura ............ G03F 3/108
                                                            428/32.79
2014/0227463 A1*  8/2014 Srivatsan ............... B41M 5/508
                                                            428/32.38
(Continued)

FOREIGN PATENT DOCUMENTS

CN     105885674 A     8/2016
CN     109796593 A     5/2019
(Continued)

OTHER PUBLICATIONS

Office Action for Japanese Patent Application No. 2021-134450 issued by the Japanese Patent Office dated Aug. 2, 2022.
(Continued)

*Primary Examiner* — Megan McCulley
(74) *Attorney, Agent, or Firm* — IP & T GROUP LLP

(57) ABSTRACT

The embodiments relate to a polyamide-based composite film that not only has excellent curl characteristics, mechanical properties, and optical properties, but also exhibits a privacy protection effect at a wide angle of view and glossiness characteristics similar to those glass at a main angle of view, and to a display device comprising the same. There are provided a polyamide-based composite film that comprises a base film comprising a polyamide-based polymer; and a functional layer disposed on the base film, wherein a glossiness control value according to Equation 1 is 0 or more, and a displace device comprising the same.

11 Claims, 2 Drawing Sheets

(56) References Cited

U.S. PATENT DOCUMENTS

2015/0328913 A1* 11/2015 Sakamoto ............... B41M 5/42
                                                           428/32.5
2018/0113350 A1   4/2018 Jee et al.
2019/0233590 A1*  8/2019 Jeong ...................... C08J 5/18
2019/0257981 A1*  8/2019 Togawa ................... G02B 1/11

FOREIGN PATENT DOCUMENTS

| JP | 2004-264716 A | 9/2004 |
| JP | 2008-216330 A | 9/2008 |
| JP | 2018-066002 A | 4/2018 |
| JP | 2020-109160 A | 7/2020 |
| KR | 10-2007-0094184 A | 9/2007 |
| KR | 10-2019-0094945 A | 8/2019 |

OTHER PUBLICATIONS

Office Action for the Korean Patent Application No. 10-2020-0112924 issued by the Korean Intellectual Property Office dated Nov. 9, 2022.

Office Action for the Chinese Patent Application No. 202111032808.4 issued by the Chinese Patent Office dated Nov. 30, 2022.

\* cited by examiner

[Fig. 1]
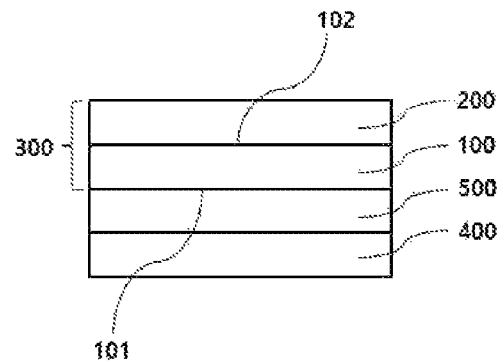
[Fig. 2]
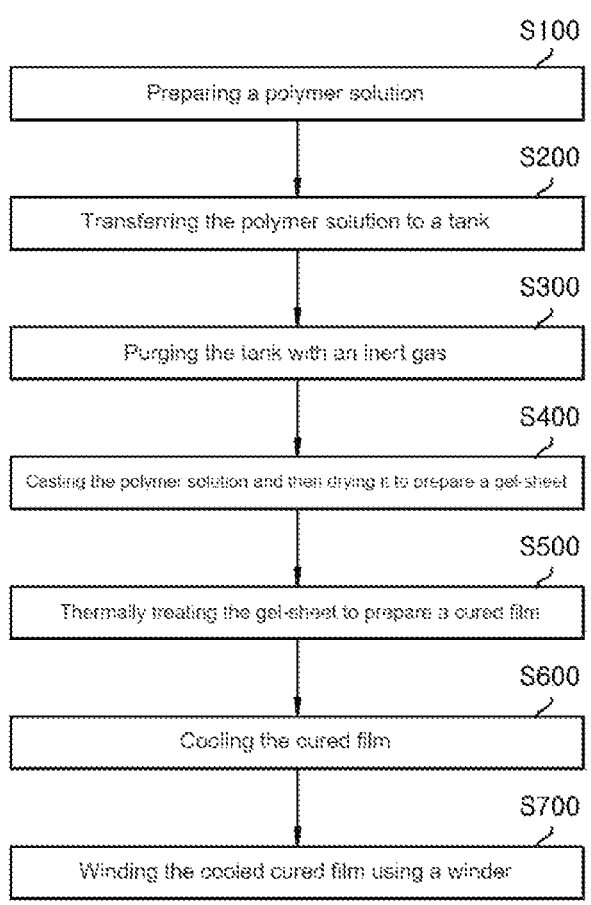

[Fig. 3]
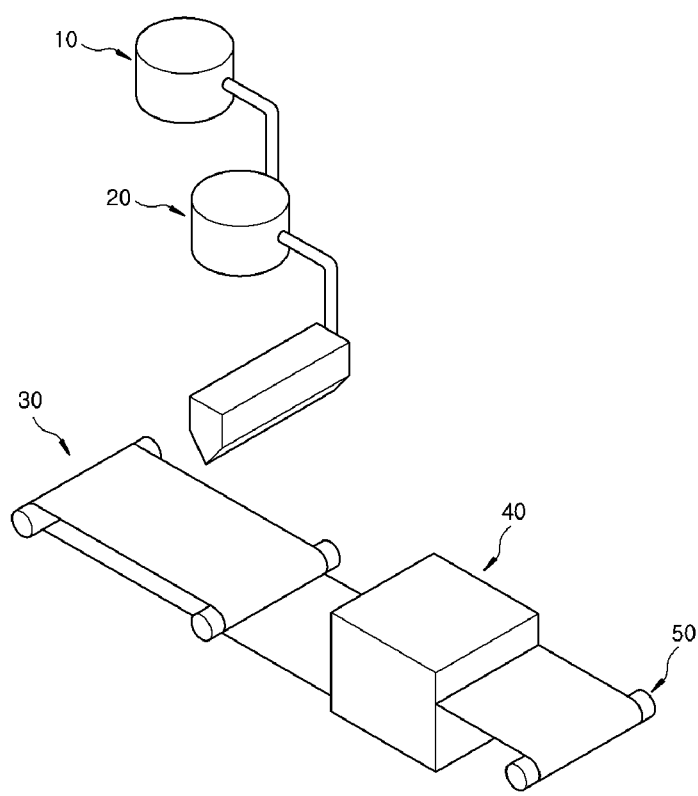

POLYAMIDE-BASED COMPOSITE FILM AND DISPLAY DEVICE COMPRISING SAME

The present application claims priority of Korean patent application number 10-2020-0112924 filed on Sep. 4, 2020. The disclosure of each of the foregoing applications is incorporated herein by reference in its entirety.

TECHNICAL FIELD

Embodiments relate to a polyamide-based composite film that not only has excellent curl characteristics, mechanical properties, and optical properties, but also exhibits a privacy protection effect at a wide angle of view and glossiness characteristics similar to glass at a main angle of view, and to a display device comprising the same.

BACKGROUND ART

Polyamide-based polymers such as poly(amide-imide) (PAI) are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyamide is used in various fields. For example, polyamide is made in the form of a powder and used as a coating for a metal or a magnetic wire. It is mixed with other additives depending on the application thereof. In addition, polyamide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide has been developed in the form of a film, which is less expensive and has excellent optical, mechanical, and thermal characteristics. Such a polyamide-based film may be applied to display materials for organic light-emitting diodes (OLEDs) or liquid crystal displays (LCDs), and the like, and to antireflection films, compensation films, and retardation films if retardation properties are implemented.

DETAILED DESCRIPTION OF THE INVENTION

Technical Problem

An object of the embodiments is to provide a polyamide-based composite film that not only has excellent curl characteristics, mechanical properties, and optical properties, but also produces a privacy protection effect at a wide angle of view and exhibits glossiness characteristics similar to glass at a main angle of view and to provide a display device comprising the same.

Solution to the Problem

An embodiment provides a polyamide-based composite film, which comprises a base film comprising a polyamide-based polymer; and a functional layer disposed on the base film, wherein a glossiness control value of the polyamide-based composite film according to the following Equation 1 is 0 or more.

$$\text{Glossiness control value} = \text{glossiness at } 85° (GL_{85}) - \text{glossiness at } 20° (GL_{20}) \quad \text{[Equation 1]}$$

In Equation 1, the glossiness at 85° ($GL_{85}$) is glossiness measured according to the JIS Z 8741-1997 standard with the polyamide-based composite film at an incident angle of 85°, and the glossiness at 20° ($GL_{20}$) is glossiness measured according to the JIS Z 8741-1997 standard with the polyamide-based composite film at an incident angle of 20°.

Another embodiment provides a display device, which comprises a display unit; and a polyamide-based composite film disposed on the display unit, wherein the polyamide-based composite film comprises a base film comprising a polyamide-based polymer; and a functional layer disposed on the base film, and the glossiness control value of the polyamide-based composite film according to the above Equation 1 is 0 or more.

Advantageous Effects of the Invention

The polyamide-based composite film according to the embodiment is not only excellent in optical characteristics in terms of high transmittance and low haze, but also excellent in mechanical characteristics in terms of excellent curl characteristics, high surface hardness, and low surface roughness.

In particular, the polyamide-based composite film according to the embodiment produces a privacy protection effect at a wide angle of view as it exhibits a level of glossiness of the conventional polyamide-based films, while it exhibits a level of glossiness similar to that of glass at a main angle of view, whereby it is possible to achieve excellent visibility and an aesthetic feeling similar to glass.

Further, the polyamide-based composite film according to the embodiment satisfies excellent flexibility and high surface hardness characteristics at the same time, so that it can be advantageously applied to a foldable display device or a flexible displace device.

BRIEF DESCRIPTION OF THE DRAWING

FIG. 1 is a cross-sectional view of a display device according to an embodiment.

FIG. 2 is a schematic flow diagram of a process for preparing a base film according to an embodiment.

FIG. 3 schematically illustrates process facilities for preparing a base film according to an embodiment.

BEST MODE FOR CARRYING OUT THE INVENTION

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expressions related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

A polyamide-based film that can be applied to a display material such as an organic light emitting diode and a liquid crystal display is required to have excellent optical, mechanical, and thermal characteristics.

When the polyamide-based film is applied to a display device, a transparent cover window comprising a hard coating layer and a base film is employed in the display device. In such a case, there may be a problem in that in the process of forming the hard coating layer on the base film, the haze of the transparent cover window is increased, or defects may occur due to insufficient adhesive strength. The produced transparent cover window has a higher level of glossiness than that of glass at a main angle of view, whereby the visibility is deteriorated or an aesthetic feeling similar to glass cannot be achieved, making it inappropriate for use as a substitute for glass.

Further, in the case of a film applicable to a display device, which has a functional layer such as the hard coating layer applied thereto, the mechanical strength is to be high when it is applied to a flexible display, as well as a technology that does not cause curling at the edge of the film during the manufacturing process or use is required. In such a case, it may be more effective, for example, for protecting the surface of the display device.

Accordingly, it has been confirmed that the polyamide-based composite film according to an embodiment produces a privacy protection effect in the vicinity of a wide angle of view (for example, 85°) as it exhibits a level of glossiness of the conventional polyamide-based films, while it exhibits a level of glossiness similar to that of glass at a main angle of view (for example, 20°); thus, it is suitable for a transparent cover window and a display device comprising the same as it achieves excellent visibility and an aesthetic feeling similar to glass, whereby the embodiment has been completed.

Polyamide-Based Composite Film

The embodiment provides a polyamide-based composite film, which not only has excellent mechanical properties and optical characteristics, but also exhibits a level of glossiness of the conventional polyamide-based films at a wide angle of view (for example, an incident angle of 85°), while it exhibits a level of glossiness similar to that of glass at a main angle of view (for example, an incident angle of 20°), thereby enhancing the visibility and achieving an aesthetic feeling similar to glass.

The polyamide-based composite film according to an embodiment comprises a base film comprising a polyamide-based polymer; and a functional layer disposed on the base film.

In an embodiment, the polyamide-based composite film has a glossiness control value according to the following Equation 1 of 0 or more.

$$\text{Glossiness control value} = \text{glossiness at } 85° (GL_{85}) - \text{glossiness at } 20° (GL_{20})$$ [Equation 1]

In Equation 1, the glossiness at 85° ($GL_{85}$) is glossiness measured according to the JIS Z 8741-1997 standard with the polyamide-based composite film at an incident angle of 85°, and the glossiness at 20° ($GL_{20}$) is glossiness measured according to the JIS Z 8741-1997 standard with the polyamide-based composite film at an incident angle of 20°.

Specifically, the glossiness control value of the polyamide-based composite film may 0 to 30, 0 to 25, 0 to 20, or 2 to 20, but it is not limited thereto.

The glossiness control value refers to a value representing the difference between the glossiness at 85° and the glossiness at 20°. It is a measure associated with certain levels of the achievement of an aesthetic feeling similar to glass, the enhancement in visibility at a main angle of view, and the effect of privacy protection at a wide angle of view.

That is, in the case of a polyamide-based composite film satisfying a glossiness control value of 0 or more, specifically, 0 to 30, it produces a privacy protection effect at a wide angle of view as it exhibits a level of glossiness of the conventional polyamide-based films, while it exhibits a level of glossiness similar to that of glass at a main angle of view, thereby enhancing the visibility and achieving an aesthetic feeling similar to glass; thus, it is readily applicable to a transparent cover window and a display device comprising the same.

On the other hand, in the case of a polyamide-based composite film having a glossiness control value of less than 0, the glossiness at a main angle of view is higher than that of glass, thereby deteriorating the visibility, or an aesthetic feeling similar to glass cannot be achieved; thus, it is not suitable for commercialization as a substitute for glass.

In an embodiment, the polyamide-based composite film has a glossiness at 20° ($GL_{20}$) of 80 to 120. Here, the glossiness at 20° ($GL_{20}$) is glossiness measured according to the JIS Z 8741-1997 standard with the polyamide-based composite film at an incident angle of 20°.

Specifically, the glossiness at 20° ($GL_{20}$) may be 85 to 120, 90 to 120, 90 to 115, 90 to 110, or 95 to 110, but it is not limited thereto.

The polyamide-based composite film has a glossiness at 60° ($GL_{60}$) of 90 to 165. Here, the glossiness at 60° ($GL_{60}$) is glossiness measured according to the JIS Z 8741-1997 standard with the polyamide-based composite film at an incident angle of 60°.

Specifically, the glossiness at 60° ($GL_{60}$) may be 95 to 165, 90 to 162, 95 to 162, 100 to 165, 110 to 165, 120 to 165, 130 to 165, or 140 to 165, but it is not limited thereto.

The polyamide-based composite film has a glossiness at 85° ($GL_{85}$) of 90 to 117. Here, the glossiness at 85° ($GL_{85}$) is glossiness measured according to the JIS Z 8741-1997 standard with the polyamide-based composite film at an incident angle of 85°.

Specifically, the glossiness at 85° ($GL_{85}$) may be 95 to 117 or 100 to 117, but it is not limited thereto.

If the polyamide-based composite film has a glossiness at 20° ($GL_{20}$), a glossiness at 60° ($GL_{60}$), and a glossiness at 85° ($GL_{85}$) within the above ranges, it is possible to exhibit glossiness characteristics similar to glass at a main angle of view, thereby enhancing the visibility, and to exhibit a high level of glossiness at a wide angle of view, thereby producing a privacy protection effect. In addition, since it is suitable for use as a substitute film for glass as a cover window for a display, it can secure even lightweight as compared with glass.

The polyamide-based composite film according to an embodiment has an average glossiness ($GL_{AVG}$) of 90 to 130, which is an average value of a glossiness at 20° ($GL_{20}$), a glossiness at 60° ($GL_{60}$), and a glossiness at 85° ($GL_{85}$).

Specifically, the average glossiness may be 95 to 130, 98 to 130, 100 to 130, 110 to 130, or 120 to 130, but it is not limited thereto.

If the polyamide-based composite film has an average glossiness within the above range, it is possible to have glossiness characteristics similar to glass and to achieve an aesthetic feeling similar to glass, so that it is suitable for use as a substitute for glass. Since it is possible to secure lightweight and excellent folding characteristics a s compared with glass, it is readily applicable to a foldable display device or a flexible display device.

The glossiness was measured using VG-7000 equipment for a film sample of 20 mm×60 mm×50 µm according to the JIS Z 8741-1997 standard, in which the incident angle and the light receiving angle were set to be the same. The incident angle was 20°, 60°, and 85°. Specifically, after the polyamide-based composite film was prepared, the functional layer was brought into contact with the measuring unit of the glossiness meter, and the glossiness of the polyamide-based composite film was then measured.

In an embodiment, in the polyamide-based composite film, the surface hardness of one side of the functional layer positioned opposite to the side in contact with the base film is 5H or higher.

If the surface hardness of the polyamide-based composite film is within the above range, it is resistant to scratches or strong impacts when applied to a display device; thus, the display device can be well protected.

In another embodiment, in the polyamide-based composite film, the surface roughness (Ra) of one side of the functional layer positioned opposite to the side in contact with the base film is 0.06 µm or less.

Specifically, the surface roughness (Ra) may be 0.05 µm or less, but it is not limited thereto.

If the surface roughness of the polyamide-based composite film is within the above range, when the composite film is applied to a display device, it is possible to achieve a film having a level of glossiness similar to that of glass, to reduce the reflection of the display at a main angle of view, resulting in the effect of increased visibility, and to exhibit excellent curl characteristics. Thus, it is readily applicable to a flexible display device or a foldable display device.

In still another embodiment, the polyamide-based composite film has a curl height of 15 mm or less.

The polyamide-based composite film is cut to a size of 10 cm×10 cm, it is placed on a glass plate such that the base film is in contact with the glass plate, and the height distanced from the 4 corners of the glass plate is measured at 25° C. and 50% RH. The curl height refers to an average value of the heights.

Specifically, the curl height of the polyamide-based composite film may be 10 mm or less, 1 mm to 15 mm, 2 mm to 15 mm, 4 mm to 15 mm, or 4 mm to 10 mm, but it is not limited thereto.

The polyamide-based composite film has a haze of 1% or less. For example, the haze may be 0.8% or less, 0.6% or less, 0.5% or less, 0.42% or less, or 0.41% or less, but it is not limited thereto.

The polyamide-based composite film has a transmittance of 80% or more. For example, the transmittance may be 82% or more, 85% or more, 88% or more, 89% or more, 90% or more, 91% or more, 90% to 99% or 91% to 99%, but it is not limited thereto.

The polyamide-based composite film has a yellow index of 5 or less. For example, the yellow index may be 4 or less, 3.5 or less, or 3 or less, but it is not limited thereto.

If the haze, transmittance, and yellow index of the polyamide-based composite film are within the above ranges, it is colorless and transparent and has excellent optical and mechanical properties; thus, it is suitable for use as a substitute film for glass as a cover window for a display.

Referring to FIG. 1, the polyamide-based composite film according to an embodiment comprises a base film (100) and a functional layer (200) disposed on the base film (100).

The base film (100) may be a support layer that supports the functional layer (200). In addition, the base film (100) may comprise a polyamide-based polymer. For example, the base film (100) may be a polyamide-based film.

The functional layer (200) may be formed as a coating on the base film (100). The functional layer (200) may be laminated on the base film (100). The functional layer (200) may be bonded on the base film (100).

The functional layer (200) may be a coating layer coated on the base film (100). The functional layer (200) may comprise a curable resin. Specifically, the functional layer (200) may be a curable coating layer.

The functional layer (200) may function to enhance the mechanical properties and/or optical properties of the base film (100). The functional layer may comprise an antireflection layer, an antifouling layer, a hard coating layer, and a scratch-resistant layer.

As shown in FIG. 1, the functional layer (200) comprises a second side (102). The second side (102) is a side located on the side of the functional layer (200) on which the base film (100) is disposed. The second side (102) is a side located on the side of the functional layer (200) in contact with the base film (100). The second side (102) may be the lower side of the functional layer (200). For example, the second side (102) may be the bottom side of the functional layer (200).

The base film (100) comprises a first side (101). The first side (101) is a side opposite to the side of the base film (100) on which the functional layer (200) is disposed.

The first side (101) is a side located opposite to the side of the base film (100) in contact with the functional layer (200). The first side (101) may be the lower side of the base film (100). For example, the first side (101) may be the bottom side of the base film (100).

Base Film (100)

The base film (100) according to an embodiment comprises a polyamide-based polymer.

The base film (100) may further comprise a matting agent.

The matting agent may be at least one selected from the group consisting of silica, poly(methyl methacrylate) (PMMA), poly(butyl methacrylate) (PBMA), polystyrene (PS), melamine, silicone, barium sulfate, and glass.

The matting agent may have an average particle diameter of 10 nm to 1,000 nm. For example, the average particle diameter of the matting agent may be 50 nm to 800 nm, 50 nm to 500 nm, 50 nm to 300 nm, 50 nm to 200 nm, 70 nm to 180 nm, or 100 nm to 150 nm, but it is not limited thereto.

Since the base film comprises the matting agent, it is possible to lower the glossiness, thereby obtaining a film that has a level of glossiness similar to that of glass. Further, it is possible to enhance the effect of improving the scratches generated at the time of sliding during the film preparation by enhancing the surface roughness and windability and to achieve an aesthetic feeling similar to that of glass. Further, it produces the effect of enhancing the visibility by reducing the reflection of the display.

The base film may comprise the matting agent in an amount of 100 to 3,000 ppm, or 200 to 1,000 ppm, based on the total weight of the polyamide-based polymer.

If the content of the matting agent contained in the film exceeds the above range, the matting agent precipitates on the surface of the film to make it unavailable for the subsequent process, or the haze of the film increases, resulting in a significant deterioration in the optical properties. In addition, if the content of the matting agent is less than the above range, the coatability may be poor due to a small surface area, which may be disadvantageous for the subsequent processes, and it may cause a deterioration in the durability (e.g., detachment resistance) after the functional layer is formed on the base film.

If the average particle diameter and/or content of the matting agent satisfies the above range, the functional layer can be readily coated, and the compatibility of the base film and the functional layer in the finally manufactured film is enhanced, whereby it is possible to achieve a stable composite film. Specifically, as the average p article diameter and content of the matting agent are combined to increase the surface area of the base film, it can function as a base film suitable for the application to a composite film having excellent durability.

The content of residual solvents in the base film is 1,500 ppm or less. For example, the content of residual solvents may be 1,200 ppm or less, 1,000 ppm or less, 800 ppm or less, or 500 ppm or less, but it is not limited thereto.

The residual solvent refers to a solvent that has not been volatilized during the film production and remains in the film finally produced.

If the content of residual solvents in the base film exceeds the above range, the durability of the film may be deteriorated, and it may have an impact on the glossiness.

In addition, the base film has an IS value represented by the following Equation 2 of 10 to 200.

$$IS = IM + \frac{RS}{10} \quad \text{[Equation 2]}$$

In Equation 2, IM stands for the number of moles of the imide repeat unit when the total number of moles of the imide repeat unit and the amide repeat unit in the film is 100; and RS stands for the content (ppm) of the residual solvent in the film.

For example, the IS value may be 10 to 150, 10 to 120, or 10 to 60, but it is not limited thereto.

If the IS value of the base film satisfies the above range, it is possible to obtain a film that has excellent durability under severe conditions, is excellent in folding characteristics, and has a level of glossiness similar to that of glass.

When the base film according to an embodiment based on a thickness of 50 μm is folded to have a radius of curvature of 3 mm, the number of folding before the fracture is 200,000 or more.

The number of folding counts one when the film is folded to have a radius of curvature of 3 mm and then unfolded.

As the number of folding of the base film satisfies the above range, it can be advantageously applied to a foldable display device or a flexible display device.

The base film according to an embodiment has a surface roughness of 0.01 μm to 0.07 μm. Specifically, the surface roughness may be 0.01 μm to 0.06 μm, but it is not limited thereto.

As the surface roughness of the base film satisfies the above range, it is possible to obtain a film having a level of glossiness similar to that of glass, and it reduces the reflection of the display, thereby producing the effect of enhanced visibility thereof.

The base film according to an embodiment comprises a polyamide-based polymer, and the polyamide-based polymer is a polymer that contains an amide repeat unit. In addition, the polymer contained in the film may optionally comprise an imide repeat unit.

The base film comprises a polyamide-based polymer, and the polyamide-based polymer may be prepared by simultaneously or sequentially reacting reactants that comprise a diamine compound and a dicarbonyl compound. Specifically, the polyamide-based polymer is prepared by polymerizing a diamine compound and a dicarbonyl compound.

Alternatively, the polyamide-based polymer is prepared by polymerizing a diamine compound, a dianhydride compound, and a dicarbonyl compound. Here, the polyamide-based polymer comprises an imide repeat unit derived from the polymerization of the diamine compound and the dianhydride compound and an amide repeat unit derived from the polymerization of the diamine compound and the dicarbonyl compound.

The base film according to an embodiment comprises a polyamide-based polymer formed by polymerizing a diamine compound, a dicarbonyl compound, and optionally a dianhydride compound.

As an embodiment, the molar ratio of the dianhydride compound and the dicarbonyl compound is 0:100 to 50:50, 0:100 to 45:55, 0:100 to 30:70, 0:100 to 25:75, or 0:100 to 20:80.

If the molar ratio of the dianhydride compound and the dicarbonyl compound is within the above range, it is possible to obtain a film that exhibits glossiness characteristics similar to those of glass and has excellent folding characteristics.

As another embodiment, the dianhydride compound may be composed of zero, one, or two types, and the dicarbonyl compound may be composed of one or two types.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

[Formula 1]

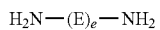

In Formula 1, E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

(E)$_e$ in Formula 1 may be selected from the groups represented by the following Formulae 1-1a to 1-14a, but it is not limited thereto.

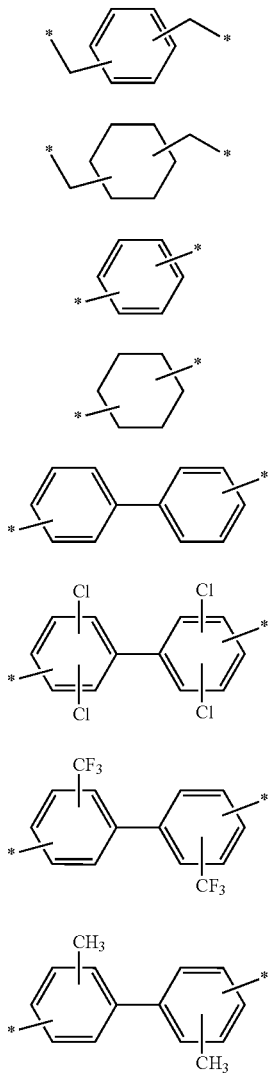

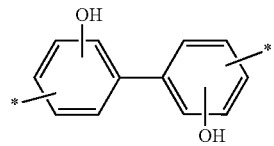

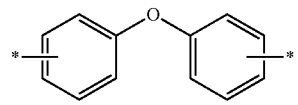

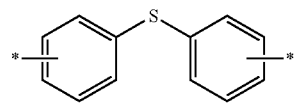

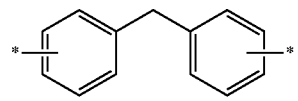

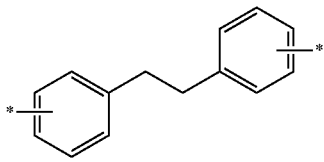

*—(CH$_2$)$_n$—*  1-14a (n is selected from integers of 1 to 12)

Specifically, (E)$_e$ in Formula 1 may be selected from the groups represented by the following Formulae 1-1b to 1-13b, but it is not limited thereto.

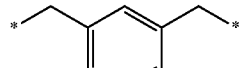

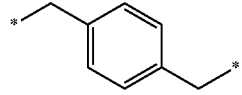

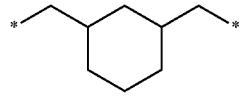

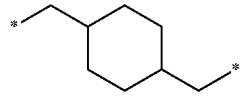

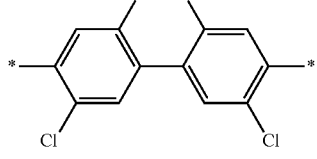

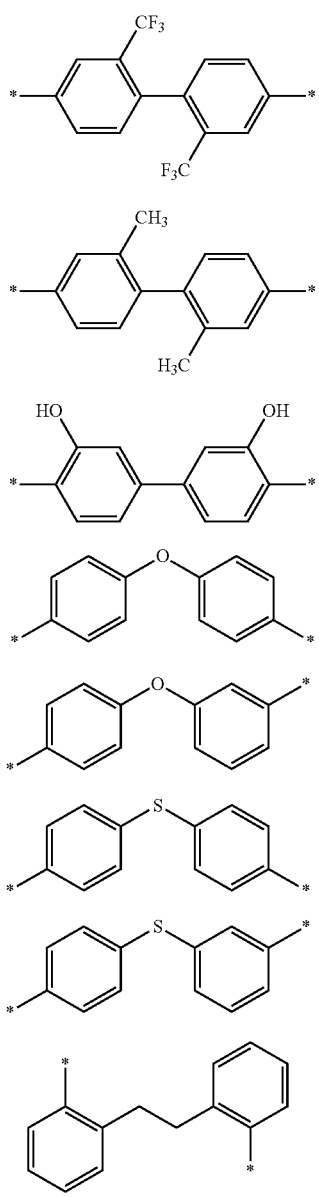

More specifically, $(E)_e$ in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

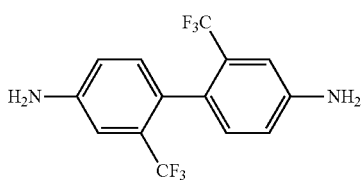

The dianhydride compound has a low birefringence value, so that it can contribute to enhancements in the optical properties such as transmittance of a film that comprises the polyimide-based polymer. The polyimide-based polymer refers to a polymer that contains an imide repeat unit.

The dianhydride compound is not particularly limited, but it may be, for example, an aromatic dianhydride compound that contains an aromatic structure. For example, the aromatic dianhydride compound may be a compound represented by the following Formula 2.

[Formula 2]

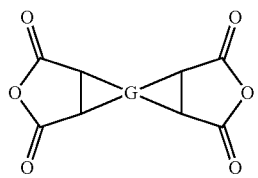

In Formula 2, G may be a group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone, may be fused to each other to form a condensed ring, or may be bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in the above Formula 2 may be selected from the groups represented by the following Formulae 2-1a to 2-9a, but it is not limited thereto.

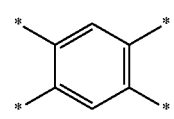

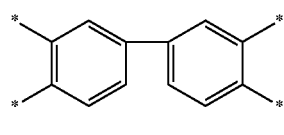

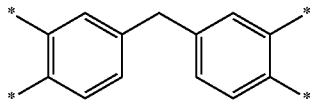

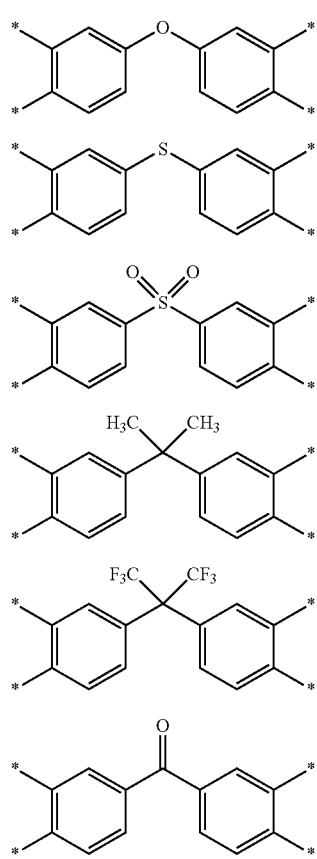

For example, G in Formula 2 may be the group represented by the above Formula 2-2a, the group represented by the above Formula 2-8a, or the group represented by the above Formula 2-9a.

In an embodiment, the dianhydride compound may comprise a compound having a fluorine-containing substituent, a compound having a biphenyl group, or a compound having a ketone group.

The dianhydride compound may be composed of a compound having a fluorine-containing substituent. In such event, the fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the dianhydride compound may comprise 2,2'-bis-(3,4-dicarboxyphenyl)hexafluoropropane dianhydride (6-FDA) represented by the following formula, but it is not limited thereto.

6-FDA

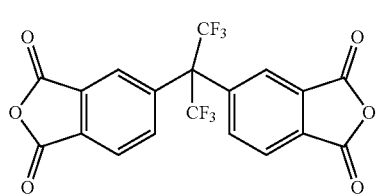

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

[Formula A]

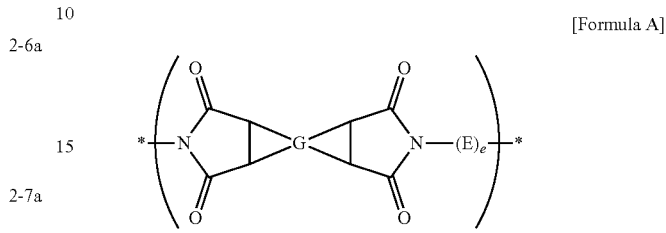

In Formula A, E, G, and e are as described above.

For example, the polyimide may comprise a repeat unit represented by the following Formula A-1, but it is not limited thereto.

[Formula A-1]

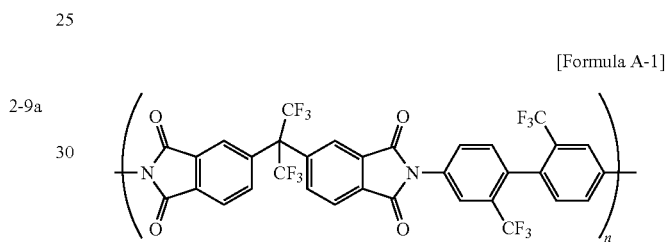

In Formula A-1, n is an integer of 1 to 400.

The dicarbonyl compound is not particularly limited, but it may be, for example, a compound represented by the following Formula 3.

[Formula 3]

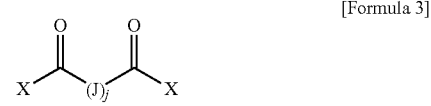

In Formula 3, J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be $C_1$, but it is not limited thereto.

(J)$_j$ in the above Formula 3 may be selected from the groups represented by the following Formulae 3-1a to 3-14a, but it is not limited thereto.

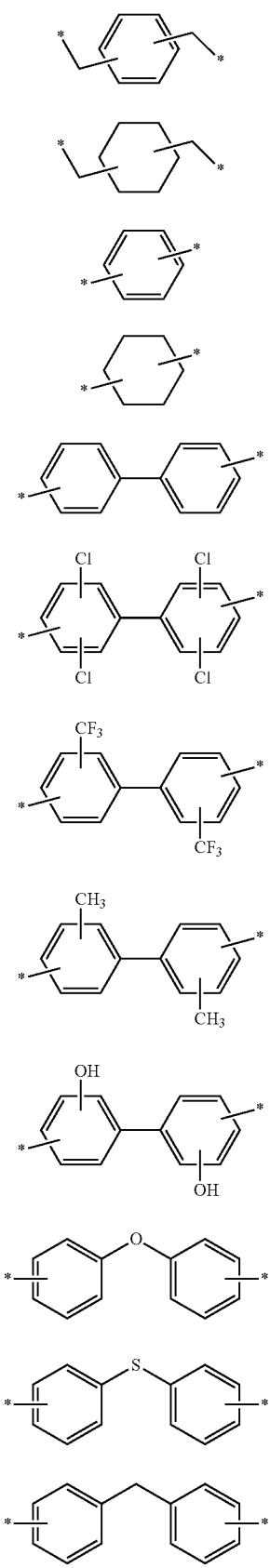

3-1a
3-2a
3-3a
3-4a
3-5a
3-6a
3-7a
3-8a
3-9a
3-10a
3-11a
3-12a

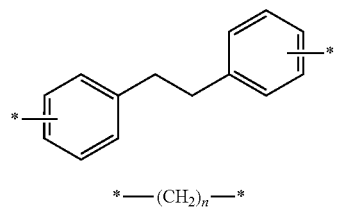

3-13a 3-14a

*—(CH$_2$)$_n$—*

(n is selected from integers of 1 to 12)

Specifically, (J)$_j$ in the above Formula 3 may be selected from the groups represented by the following Formulae 3-1b to 3-8b, but it is not limited thereto.

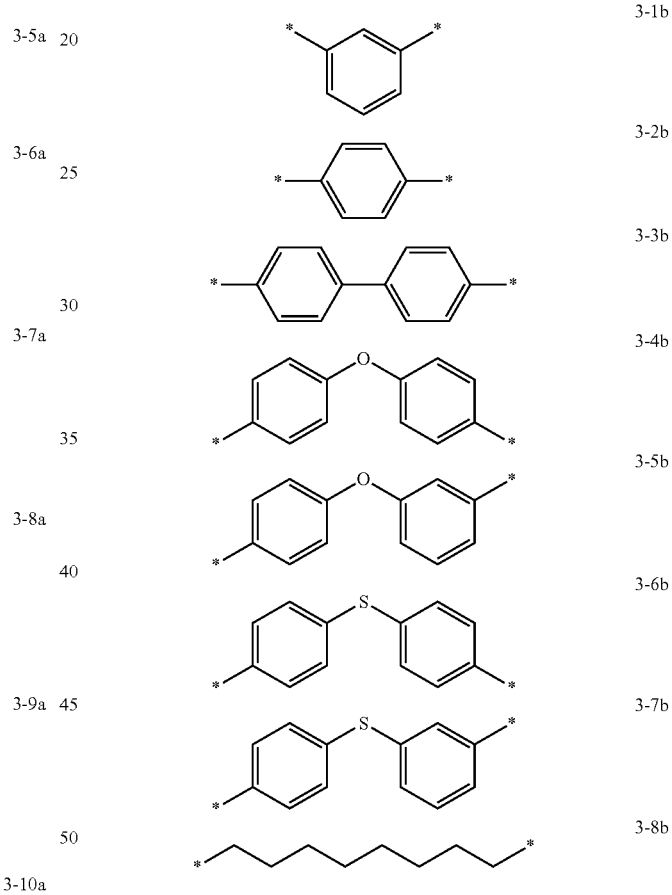

3-1b
3-2b
3-3b
3-4b
3-5b
3-6b
3-7b
3-8b

More specifically, (J)$_j$ in Formula 3 may be the group represented by the above Formula 3-1b, the group represented by the above Formula 3-2b, the group represented by the above Formula 3-3b, or the group represented by the above Formula 3-8b. In an embodiment, a mixture of at least two kinds of dicarbonyl compounds different from each other may be used as the dicarbonyl compound. If two or more dicarbonyl compounds are used, at least two dicarbonyl compounds in which (J)$_j$ in the above Formula 2 is selected from the groups represented by the above Formulae 3-1b to 3-8b may be used as the dicarbonyl compound.

In another embodiment, the dicarbonyl compound may be an aromatic dicarbonyl compound that contains an aromatic structure.

For example, the dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film that comprises the polyamide-based polymer thus produced.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

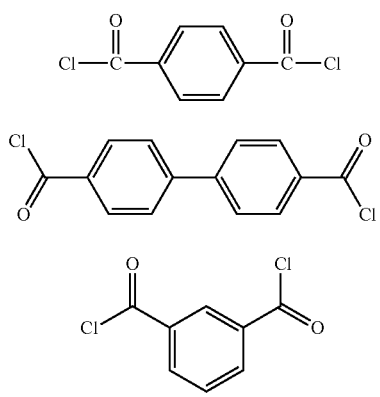

TPC

BPDC

IPC

For example, the first dicarbonyl compound may comprise BPDC, and the second dicarbonyl compound may comprise TPC, but they are not limited thereto.

Specifically, if BPDC is used as the first dicarbonyl compound and TPC is used as the second dicarbonyl compound in a proper combination, a film that comprises the polyamide-based polymer thus produced may have high oxidation resistance.

Alternatively, the first dicarbonyl compound may comprise IPC, and the second dicarbonyl compound may comprise TPC, but they are not limited thereto.

If IPC is used as the first dicarbonyl compound and TPC is used as the second dicarbonyl compound in a proper combination, a film that comprises the polyamide-based polymer thus produced may not only have high oxidation resistance, but is also economical since the costs can be reduced.

The diamine compound and the dicarbonyl compound may be polymerized to form a repeat unit represented by the following Formula B.

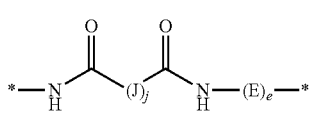

[Formula B]

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

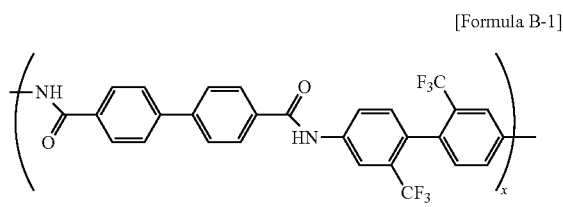

[Formula B-1]

In Formula B-1, x is an integer of 1 to 400.

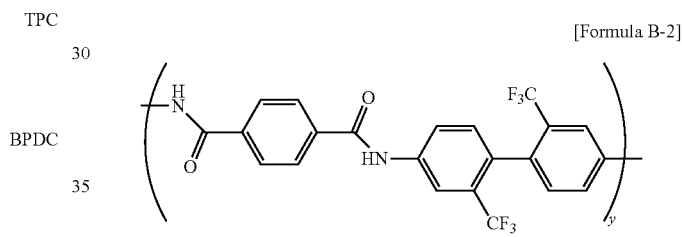

[Formula B-2]

In Formula B-2, y is an integer of 1 to 400.

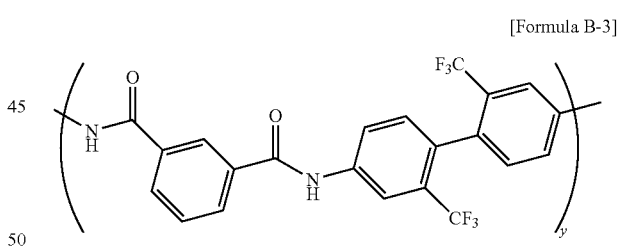

[Formula B-3]

In Formula B-3, y is an integer of 1 to 400.

According to an embodiment, the polyamide-based polymer may comprise a repeat unit represented by the following Formula A and a repeat unit represented by the following Formula B:

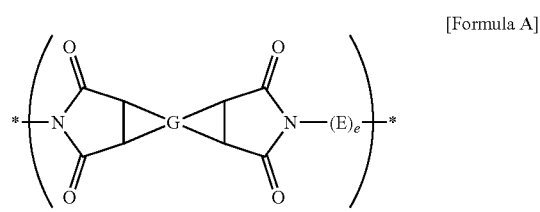

[Formula A]

-continued

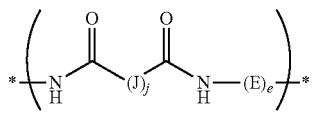
[Formula B]

In Formulae A and B, E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, G is a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group is present alone, fused to each other to form a condensed ring, or bonded by a bonding group selected from a substituted or unsubstituted $C_1$-$C_{30}$ alkylene group, a substituted or unsubstituted $C_2$-$C_{30}$ alkenylene group, a substituted or unsubstituted $C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

In the polyamide-based polymer, the molar ratio of the repeat unit represented by the above Formula A to the repeat unit represented by the above Formula B may be 0:100 to 50:50, 0:100 to 45:55, 0:100 to 30:70, 0:100 to 25:75, or 0:100 to 20:80, but it is not limited thereto.

If the molar ratio of the repeat unit represented by Formula A to the repeat unit represented by Formula B is within the above range, it is possible to achieve a film that exhibits glossiness characteristics similar to those of glass at a main angle of view, while indicating a high level of glossiness at a wide angle of view, thereby producing a privacy protection effect, has excellent folding characteristics, and is excellent in all of the mechanical properties and optical properties.

The base film has a haze of 1% or less. For example, the haze may be 0.8% or less, 0.6% or less, 0.5% or less, or 0.4% or less, but it is not limited thereto.

The base film has a transmittance of 80% or more. For example, the transmittance may be 82% or more, 85% or more, 88% or more, 89% or more, 80% to 99%, 88% to 99%, or 89% to 99%, but it is not limited thereto.

The base film has a yellow index of 5 or less. For example, the yellow index may be 4 or less, 3.5 or less, or 3 or less, but it is not limited thereto.

The base film has a modulus of 5.0 GPa or more. Specifically, the modulus may be 5.5 GPa or more, 6.0 GPa or more, 6.5 GPa or more, or 7.0 GPa or more, but it is not limited thereto.

The base film has a compressive strength of 0.4 kgf/µm or more. Specifically, the compressive strength may be 0.45 kgf/µm or more, or 0.46 kgf/µm or more, but it is not limited thereto.

When the base film is perforated at a speed of 10 mm/min using a 2.5-mm spherical tip in a UTM compression mode, the maximum diameter (mm) of perforation including a crack is 60 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The base film has a surface hardness of HB or higher. Specifically, the surface hardness may be H or higher, or 2H or higher, but it is not limited thereto.

The base film has a tensile strength of 15 kgf/mm$^2$ or more. Specifically, the tensile strength may be 18 kgf/mm$^2$ or more, 20 kgf/mm$^2$ or more, 21 kgf/mm$^2$ or more, or 22 kgf/mm$^2$ or more, but it is not limited thereto.

The base film has an elongation of 15% or more. Specifically, the elongation may be 16% or more, 17% or more, or 17.5% or more, but it is not limited thereto.

The base film according to an embodiment has excellent optical properties in terms of low haze, low yellow index, and high transmittance, as well as low glossiness characteristics similar to those of glass, and may secure excellent folding characteristics. As a result, it produces the effect of enhancing the aesthetic feeling and visibility of the display.

The physical properties of the base film as described above are based on a thickness of 40 µm to 60 µm. For example, the physical properties of the base film are based on a thickness of 50 µm.

The features on the components and properties of the base film as described above may be combined with each other.

In addition, the properties of the base film as described above are the results materialized by combinations of the chemical and physical properties of the components, which constitute the base film, along with the conditions in each step of the process for preparing the base film as described below.

For example, the composition and content of the components that constitute the base film, the types and contents of additives, the range of surface roughness, the thermal treatment and cooling temperature conditions in the film preparation process, and the like are all combined to achieve the desired level of glossiness.

Process for Preparing a Base Film (100)

An embodiment provides a process for preparing a base film.

The process for preparing a base film according to an embodiment comprises preparing a polyamide-based polymer solution in an organic solvent; transferring the polymer solution to a tank; casting the polymer solution in the tank onto a belt and then drying it to prepare a gel-sheet; thermally treating the gel-sheet while it is moved to prepare a cured film; and cooling the cured film while it is moved.

Referring to FIG. 2, the process for preparing a base film comprises simultaneously or sequentially mixing a diamine compound and a dicarbonyl compound, or a diamine compound, a dianhydride compound, and a dicarbonyl compound, in an organic solvent in a polymerization apparatus, and reacting the mixture to prepare a polymer solution (S100); charging the polymer solution to a tank (S200); purging with an inert gas (S300); casting the polymer solution in the tank onto a belt and then drying it to prepare a gel-sheet (S400); thermally treating the gel-sheet while it is moved to prepare a cured film (S500); cooling the cured film while it is moved (S600); and winding the cooled cured film using a winder (S700).

The base film is a film that comprises a polyamide-based polymer as a main component. The polyamide-based polymer is a polymer that comprises an amide repeat unit as a structural unit. In addition, the polyamide-based film may comprise an imide repeat unit.

In the process for preparing a base film, a polymer solution for preparing the polyamide-based polymer is prepared by simultaneously or sequentially mixing a diamine compound and a dicarbonyl compound, or a diamine compound, a dianhydride compound, and a dicarbonyl compound, in an organic solvent in a polymerization apparatus, and reacting the mixture (S100).

In an embodiment, the polymer solution may be prepared by simultaneously mixing and reacting a diamine compound and a dicarbonyl compound, or a diamine compound, a dianhydride compound, and a dicarbonyl compound, in an organic solvent.

In another embodiment, the step of preparing the polymer solution may comprise mixing and reacting the diamine compound and the dicarbonyl compound in a solvent to produce a polyamide (PA) solution. The polyamide solution is a solution that comprises a polymer having an amide repeat unit.

In still another embodiment, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond and an imide bond. The polyamic acid solution is a solution that comprises a polyamic acid.

Alternatively, the step of preparing the polymer solution may comprise first mixing and reacting the diamine compound and the dianhydride compound in a solvent to produce a polyamic acid solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound in a solvent to produce a polyamide (PA) solution; and second mixing and reacting the polyamide (PA) solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

The polymer contained in the polymer solution comprises an amide repeat unit derived from the polymerization of the diamine compound and the dicarbonyl compound.

Alternatively, the polymer contained in the polymer solution comprises an imide repeat unit derived from the polymerization of the diamine compound and the dianhydride compound and an amide repeat unit derived from the polymerization of the diamine compound and the dicarbonyl compound.

The content of solids contained in the polymer solution may be 10% by weight to 30% by weight. Alternatively, the content of solids contained in the second polymer solution may be 15% by weight to 25% by weight, but it is not limited thereto.

If the content of solids contained in the polymer solution is within the above range, a base film can be effectively produced in the extrusion and casting steps. In addition, the base film thus produced may have mechanical properties in terms of an improved modulus and the like and optical properties in terms of a low yellow index and the like.

In an embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.4 molar equivalent based on 1 mole of the polyamic acid, but it is not limited thereto.

The further addition of the catalyst may expedite the reaction rate and enhance the chemical bonding force between the repeat unit structures or that within the repeat unit structures.

In another embodiment, the step of preparing the polymer solution may further comprise adjusting the viscosity of the polymer solution.

Specifically, the step of preparing the polymer solution may comprise (a) simultaneously or sequentially mixing and reacting a diamine compound and a dicarbonyl compound, or a diamine compound, a dianhydride compound, and a dicarbonyl compound, in an organic solvent to prepare a first polymer solution; (b) measuring the viscosity of the first polymer solution and evaluating whether the target viscosity has been reached; and (c) if the viscosity of the first polymer solution does not reach the target viscosity, further adding the dicarbonyl compound to prepare a second polymer solution having the target viscosity.

The target viscosity may be 100,000 cps to 500,000 cps at room temperature. Specifically, the target viscosity may be 100,000 cps to 400,000 cps, 100,000 cps to 350,000 cps, 100,000 cps to 300,000 cps, 150,000 cps to 300,000 cps, or 150,000 cps to 250,000 cps, but it is not limited thereto.

In the steps of preparing the first polymer solution and the second polymer solution, the polymer solutions have viscosities different from each other. For example, the second polymer solution has a viscosity higher than that of the first polymer solution. In the steps of preparing the first polymer solution and the second polymer solution, the stirring speeds are different from each other. For example, the stirring speed when the first polymer solution is prepared is faster than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example, 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

If the pH of the polymer solution is adjusted to the above range, it is possible to prevent the damage to the equipment in the subsequent process, to prevent the occurrence of defects in the film produced from the polymer solution, and to achieve the desired optical properties and mechanical properties in terms of yellow index and modulus.

The pH adjusting agent may be employed in an amount of 0.1% by mole to 10% by mole based on the total number of moles of monomers in the polymer solution.

In another embodiment, the step of preparing the polymer solution may further comprise purging with an inert gas. The step of purging with an inert gas may remove moisture, reduce impurities, increase the reaction yield, and impart excellent surface appearance and mechanical properties to the film finally produced.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

In another embodiment, the process for preparing a base film may further comprise adding a matting agent.

The step of adding the matting agent may be carried out before preparing the polymer solution or may be carried out after preparing the polymer solution. That is, the matting agent is first dissolved in an organic solvent, and the mixture is then reacted to prepare the polymer. Alternatively, the mixture is first reacted in an organic solvent, and the matting agent is then added to the organic solvent.

Specifically, the process may comprise preparing a polyamide-based polymer solution and then adding a matting agent to the organic solvent.

Accordingly, it is possible to lower the glossiness, thereby obtaining a film that has a level of glossiness similar to that of glass. Further, it is possible to enhance the effect of improving the scratches generated at the time of sliding during the film preparation by enhancing the surface roughness and windability and to achieve an aesthetic feeling similar to that of glass. Further, it produces the effect of enhancing the visibility of the display.

Details on the type and content of the matting agent are as described above.

The molar ratio of the dianhydride compound to the dicarbonyl compound used to prepare the polymer solution may be 0:100 to 50:50, for example, 0:100 to 45:55, 0:100 to 30:70, 0:100 to 25:75, or 0:100 to 20:80. As the dianhydride compound and the dicarbonyl compound are employed in the above molar ratio, it is advantageous for achieving the desired levels of mechanical properties and optical properties, in particular, glossiness, of the base film prepared from the polymer solution.

If the above range is not satisfied, such mechanical properties as the number of folding and hardness or such optical properties as transparency may be deteriorated.

Details on the diamine compound, the dianhydride compound, and the dicarbonyl compound are as described above.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

Next, after the step of preparing the polymer solution, the polymer solution is transferred to a tank (S200).

FIG. 3 schematically illustrates process facilities for preparing the base film according to an embodiment. Referring to FIG. 3, the polymer solution as described above is prepared in a polymerization apparatus (10), and the polymer solution thus produced is transferred to, and stored in, a tank (20).

Here, once the polymer solution has been prepared, the step of transferring the polymer solution to the tank is carried out without any additional steps. Specifically, the polymer solution prepared in the polymerization apparatus is transferred to, and stored in, the tank without any separate precipitation and redissolution steps for removing impurities. In the conventional process, in order to remove impurities such as hydrochloric acid (HCl) generated during the preparation of a polymer solution, the polymer solution thus prepared is purified through a separate step to remove the impurities, and the purified polymer solution is then redissolved in a solvent. In this case, however, there has been a problem that the loss of the active ingredient increases in the step of removing the impurities, resulting in decreases in the yield.

Accordingly, the preparation process according to an embodiment ultimately minimizes the amount of impurities generated in the step of preparing the polymer solution or properly controls the impurities in the subsequent steps, even if a certain amount of impurities is present, so as not to deteriorate the physical properties of the final film. Thus, the process has an advantage in that a film is produced without separate precipitation or redissolution steps.

The tank (20) is a place for storing the polymer solution before forming it into a film, and its internal temperature may be −20° C. to 20° C.

Specifically, the internal temperature may be −20° C. to 10° C., −20° C. to 5° C., −20° C. to 0° C., or 0° C. to 10° C., but it is not limited thereto.

If the internal temperature of the tank (20) is controlled to the above range, it is possible to prevent the polymer solution from deteriorating during storage, and it is possible to lower the moisture content to thereby prevent defects of the film produced therefrom.

The process for preparing a base film may further comprise carrying out vacuum degassing of the polymer solution transferred to the tank (20).

The vacuum degassing may be carried out for 30 minutes to 3 hours after depressurizing the internal pressure of the tank to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the process for preparing a base film may further comprise purging the polymer solution transferred to the tank (20) with an inert gas (S300).

Specifically, the purging is carried out by purging the tank with an inert gas at an internal pressure of 1 atm to 2 atm. The inert gas purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The step of vacuum degassing and the step of purging the tank with an inert gas are performed in a separate step, respectively.

For example, the step of vacuum degassing may be carried out, followed by the step of purging the tank with an inert gas, but it is not limited thereto.

The step of vacuum degassing and/or the step of purging the tank with an inert gas may improve the physical properties of the surface of the base film thus produced.

Thereafter, the process may further comprise storing the polymer solution in the tank (20) for 1 hour to 360 hours. Here, the temperature inside the tank may be kept at −20° C. to 20° C.

The process for preparing a base film may further comprise casting the polymer solution in the tank and then drying it to prepare a gel-sheet (S400).

The polymer solution may be cast onto a casting body such as a casting roll or a casting belt.

Referring to FIG. 3, according to an embodiment, the polymer solution may be applied onto a casting belt (30) as a casting body, and it is dried while it is moved to be made into a sheet in the form of a gel.

When the polymer solution is injected onto the belt (30), the injection rate may be 300 g/min to 700 g/min. If the injection rate of the polymer solution satisfies the above range, the gel-sheet can be uniformly formed to an appropriate thickness.

In addition, the casting thickness of the polymer solution may be 200 μm to 700 μm. If the polymer solution is cast to a thickness within the above range, the final film produced after the drying and thermal treatment may have an appropriate and uniform thickness.

As described above, the viscosity of the polymer solution at room temperature may be 100,000 cps to 500,000 cps, for example, 100,000 cps to 400,000 cps, 100,000 cps to 350,000 cps, 150,000 cps to 350,000 cps, or 150,000 cps to 250,000 cps. If the viscosity satisfies the above range, the polymer solution can be cast onto a belt in a uniform thickness without defects.

The polymer solution is cast and then dried at a temperature of 60° C. to 150° C. for 5 minutes to 60 minutes to prepare a gel-sheet. The solvent of the polymer solution is partially or totally volatilized during the drying to prepare the gel-sheet.

The moving speed of the gel-sheet on the casting body at the time of drying may be 0.1 m/min to 15 m/min, for example, 0.5 m/min to 10 m/min, but it is not limited thereto.

The process for preparing a base film comprises thermally treating the gel-sheet while it is moved to prepare a cured film (S500).

Referring to FIG. 3, the thermal treatment of the gel-sheet can be carried out by passing it through a thermosetting device (40).

When the gel-sheet passes through the thermosetting device (40), it is treated with hot air.

If the thermal treatment is carried out with hot air, the heat may be uniformly supplied. If the heat is not uniformly supplied, a satisfactory surface roughness cannot be achieved, which may raise or lower the surface tension too much.

The thermal treatment of the gel-sheet is carried out in a temperature range of 60° C. to 500° C. for 5 minutes to 200 minutes. Specifically, the thermal treatment of the gel-sheet may be carried out in a temperature range of 75° C. to 460° C. at a temperature elevation rate of 1.5° C./min to 80° C./min for 10 minutes to 150 minutes.

In such event, the initial temperature of the thermal treatment of the gel-sheet may be 60° C. or higher. Specifically, it may be 60° C. to 200° C., more specifically, 80° C. to 180° C.

In addition, the maximum temperature in the thermal treatment may be 300 to 500° C. For example, the maximum temperature in the thermal treatment may be 350° C. to 500° C., 380° C. to 500° C., 400° C. to 500° C., 410° C. to 480° C., 410° C. to 470° C., or 410° C. to 450° C.

That is, referring to FIG. 2, the inlet temperature of the thermosetting device (40) may be the initial temperature of the thermal treatment, and the temperature of a certain region inside the thermosetting device (40) may be the maximum temperature in the thermal treatment.

According to an embodiment, the thermal treatment of the gel-sheet may be carried out in two or more steps.

Specifically, the thermal treatment comprises a first hot air treatment step carried out for 5 minutes to 30 minutes in a range of 60° C. to 120° C.; and a second hot air treatment step carried out for 10 minutes to 120 minutes in a range of 120° C. to 350° C.

The thermal treatment under these conditions may cure the gel-sheet to have appropriate surface hardness and modulus and may secure high light transmittance, low haze, and an appropriate level of glossiness of the cured film at the same time.

According to another embodiment, the thermal treatment may comprise passing it through an IR heater. The thermal treatment by an IR heater may be carried out for 1 minute to 30 minutes in a temperature range of 300° C. or higher. Specifically, the thermal treatment by an IR heater may be carried out for 1 minute to 20 minutes in a temperature range of 300° C. to 500° C.

The process for preparing a base film comprises cooling the cured film while it is moved (S600).

Referring to FIG. 3, the cooling of the cured film is carried out after it has been passed through the thermosetting device (40). It may be carried out by using a separate cooling chamber (not shown) or by forming an appropriate temperature atmosphere without a separate cooling chamber.

The step of cooling the cured film while it is moved may comprise a first temperature lowering step of reducing the temperature at a rate of 100° C./min to 1,000° C./min and a second temperature lowering step of reducing the temperature at a rate of 40° C./min to 400° C./min.

In such event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering step.

If the step of cooling the cured film is carried in such a multistage manner, it is possible to have the physical properties of the cured film further stabilized and to maintain the optical properties and mechanical properties of the film achieved during the curing step more stably for a long period of time.

The moving speed of the gel-sheet and the moving speed of the cured film are the same.

The process for preparing a base film comprises winding the cooled cured film using a winder (S700).

Referring to FIG. 3, the cooled cured film may be wound using a roll-shaped winder (50).

In such event, the ratio of the moving speed of the gel-sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, or 1:1.0 to 1:1.05, but it is not limited thereto.

If the ratio of the moving speeds is outside the above range, the mechanical properties of the cured film may be impaired, and the flexibility and elastic properties may be deteriorated.

In the process for preparing a base film, the thickness variation (%) according to the following Relationship 1 may be 3% to 30%. Specifically, the thickness variation (%) may be 5% to 20%, but it is not limited thereto.

Thickness variation (%)=(M1−M2)/M2×100 [Relationship 1]

In Relationship 1, M1 is the thickness (μm) of the gel-sheet, and M2 is the thickness (μm) of the cooled cured film at the time of winding.

The base film prepared by the preparation process as described above is excellent in optical properties and mechanical properties. The base film may be applicable to various uses that require flexibility, transparency, and a certain level of glossiness. For example, the base film may be applied to solar cells, displays, semiconductor devices, sensors, and the like.

In particular, since the base film can achieve a certain level of glossiness, it can be advantageously applied to a cover window for a display device and to a display device. Since it has excellent folding characteristics, it can be advantageously applied to a foldable display device or a flexible display device.

Details on the polyamide-based base film prepared by the above preparation process are as described above.

Functional Layer (200)

The functional layer (200) may comprise an organic resin.

In addition, the functional layer (200) may further comprise a filler.

The functional layer (200) may further comprise other additives.

The organic resin may be a curable resin. The organic resin may be a binder resin. The organic resin may be at least one selected from the group consisting of an acrylate-based monomer, a urethane acrylate-based oligomer, and an epoxy acrylate-based oligomer.

The acrylate-based monomer may be at least one selected from the group consisting of a substituted or unsubstituted acrylate and a substituted or unsubstituted methacrylate.

The acrylate-based monomer may contain 1 to 10 functional groups. The urethane acrylate-based oligomer may contain 2 to 15 functional groups. The epoxy acrylate-based oligomer may contain 1 to 10 functional groups.

Examples of the acrylate-based monomers include trimethylolpropane triacrylate (TMPTA), trimethylolpropaneethoxy triacrylate (TMPEOTA), glycerin propoxylated triacrylate (GPTA), pentaerythritol tetraacrylate (PETA), and dipentaerythritol hexaacrylate (DPHA).

The acrylate-based monomer may have a weight average molecular weight (Mw) of about 200 to about 2,000 g/mole, about 200 to about 1,000 g/mole, or about 200 to about 500 g/mole.

The acrylate equivalent weight of the acrylate-based monomer may range from about 50 to about 300 g/eq, from about 50 to about 200 g/eq, or from about 50 to about 150 g/eq.

Examples of the urethane acrylate-based oligomer include a bifunctional urethane acrylate oligomer having a weight average molecular weight of 1,400 to 25,000, a trifunctional urethane acrylate oligomer having a weight average molecular weight of 1,700 to 16,000, a tetra-functional urethane acrylate oligomer having a weight average molecular weight of 500 to 2,000, a hexa-functional urethane acrylate oligomer having a weight average molecular weight of 818 to 2,600, an ennea-functional urethane acrylate oligomer having a weight average molecular weight of 3,500 to 5,500, a deca-functional urethane acrylate oligomer having a weight average molecular weight of 3,200 to 3,900, and a pentakai-deca-functional urethane acrylate oligomer having a weight average molecular weight of 2,300 to 20,000.

Examples of the epoxy acrylate-based oligomer include a monofunctional epoxy acrylate oligomer having a weight average molecular weight of 100 to 300, a bifunctional epoxy acrylate oligomer having a weight average molecular weight of 250 to 2,000, and a tetra-functional epoxy acrylate oligomer having a weight average molecular weight of 1,000 to 3,000.

The epoxy equivalent weight of the epoxy acrylate-based oligomer may range from about 50 to about 300 g/eq, from about 50 to about 200 g/eq, or from about 50 to about 150 g/eq.

The content of the organic resin may be 30% by weight to 100% by weight based on the total weight of the functional layer. Specifically, the content of the organic resin may be 40% by weight to 90% by weight, 50% by weight to 90% by weight, or 50% by weight to 80% by weight, based on the total weight of the functional layer.

Examples of the filler include silica, barium sulfate, zinc oxide, and alumina.

The content of the filler may be 50,000 ppm to 400,000 ppm based on the total weight of the functional layer. Specifically, the content of the filler may be 50,000 to 350,000 ppm, 50,000 to 320,000 ppm, 70,000 to 350,000 ppm, 50,000 to 300,000 ppm, or 50,000 to 250,000 ppm, based on the total weight of the functional layer, but it is not limited thereto.

The filler may have a particle diameter of 5 nm to 100 nm. Specifically, the particle diameter of the filler may be 5 nm to 80 nm, 5 nm to 60 nm, 5 nm to 50 nm, 5 nm to 30 nm, 5 nm to 20 nm, or 10 nm to 15 nm.

The filler may be subjected to surface treatment. The filler may be subjected to surface treatment with a silane coupling agent or the like. Examples of the silane coupling agent include (meth)acrylsilane, methacroxysilane, vinylsilane, epoxy silane, and mercaptosilane.

Specifically, the filler may be a silica-based material, and the particle diameter thereof may be 5 nm to 100 nm, for example, 10 nm to 15 nm, but it is not limited thereto.

When the functional layer comprises the filler, it is possible to not only enhance the surface hardness of the polyamide-based composite film, but also affect the surface roughness and light path, thereby achieving appropriate glossiness.

In an embodiment, in the polyamide-based composite film, the base film may further comprise a matting agent, and the functional layer may further comprise a filler.

Specifically, the matting agent and the filler may be the same or different.

More specifically, both the matting agent and the filler may be silica, but they may be different in terms of particle size, distribution, content, and the like of the particles. For example, the particle diameter of the matting agent may be 100 nm to 150 nm, and the particle diameter of the filler may be 10 nm to 15 nm, but they are not limited thereto.

The functional layer may further comprise a photoinitiator.

Examples of the photoinitiator include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-

(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, and bis(2,4,6-trimethylbenzoyl)-phenylphosphine oxide, but it is not limited thereto. In addition, commercially available products include Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. The photoinitiator may be used alone or in combination of two or more different types.

The functional layer may comprise a surfactant, a UV absorber, a UV stabilizer, an anti-yellowing agent, a leveling agent, an antifouling agent, or a dye for improving chromaticity values as other additives. In addition, the content of the additives may be variously adjusted within a range that does not impair the physical properties of the functional layer. For example, the content of the additives may be about 0.01% by weight to about 10% by weight based on the total weight of the functional layer, but it is not limited thereto.

The surfactant may be a mono- to bifunctional fluorine-based acrylate, a fluorine-based surfactant, or a silicone-based surfactant. The surfactant may be employed in a form dispersed or crosslinked in the functional layer.

Examples of the UV absorber include benzophenone-based compounds, benzotriazole-based compounds, and triazine-based compounds. Examples of the UV stabilizer include tetramethyl piperidine and the like.

A coating composition may be prepared in order to form the functional layer. The coating composition comprises the organic resin, the filler, the additives, and an organic solvent.

Examples of the organic solvent include alcohol-based solvents such as methanol, ethanol, isopropyl alcohol, and butanol; alkoxy alcohol-based solvents such as 2-methoxyethanol, 2-ethoxyethanol, and 1-methoxy-2-propanol; ketone-based solvents such as acetone, methyl ethyl ketone, methyl isobutyl ketone, methyl propyl ketone, and cyclohexanone; ether-based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, and diethylene glycol-2-ethylhexyl ether; and aromatic solvents such as benzene, toluene, and xylene, which may be used alone or in combination thereof.

The content of the organic solvent is not particularly limited since it may be variously adjusted within a range that does not impair the physical properties of the coating composition. The organic solvent may be employed such that the weight ratio of the solids content of the components contained in the coating composition to the organic solvent may be about 30:70 to about 99:1. If the content of the organic solvent is within the above range, the composition may have appropriate flowability and coatability.

Since the organic solvent is used in the course of preparing the functional layer, a trace amount of the organic solvent may remain in the functional layer.

Specifically, the coating composition may comprise an organic resin and a filler.

The filler may be employed in the form of a sol dispersed in a solvent. For example, the filler is silica, and the silica may be employed in the form of a silica sol.

The coating composition may comprise a sol in which an organic resin and a filler are dispersed at a weight ratio of 80:20 to 40:60.

Specifically, the coating composition may comprise a sol in which an organic resin and a filler are dispersed at a weight ratio of 80:20 to 50:50, but it is not limited thereto.

The coating composition may be applied to the front or rear side of the base film. The coating composition may be coated by a bar coating method, a knife coating method, a roll coating method, a blade coating method, a die coating method, a microgravure coating method, a comma coating method, a slot die coating method, a lip coating method, or a solution casting method.

Thereafter, the organic solvent contained in the coating composition may be removed. The organic solvent may be removed by evaporation.

Thereafter, the coating composition layer may be cured by light and/or heat.

The functional layer upon complete curing thereof may have a thickness of about 2 μm or more, or about 3 μm or more, for example, about 2 to about 20 μm, about 2 to about 15 μm, about 2 to about 10 μm, or about 3 to about 10 μm.

An additional layer may be further interposed between the base film and the functional layer. The additional layer may be an antistatic layer, which performs an antistatic function, or may be a low refractive index layer, which performs a low reflection function. Alternatively, the functional layer itself may perform an anti static function and/or a low reflection function.

In addition, the functional layer has a refractive index of 1.45 to 1.60. Specifically, the refractive index of the functional layer may be 1.46 to 1.58, 1.46 to 1.55, 1.46 to 1.52, 1.48 to 1.51, or 1.49 to 1.51, but it is not limited thereto.

As the refractive index of the functional layer satisfies the above range, an appropriate level of glossiness of the film may be achieved.

Display Device

The display device according to an embodiment comprises a display unit; and a polyamide-based composite film disposed on the display unit, wherein the polyamide-based composite film comprises a base film and a functional layer disposed on the base film.

The polyamide-based composite film has a glossiness control value according to the above Equation 1 of 0 or more.

Here, details on the base film, the functional layer, the polyamide-based composite film, and the like are as described above.

Specifically, FIG. 1 illustrates a display device, which comprises a display unit (400) and a polyamide-based composite film (300) disposed on the display unit (400), wherein the polyamide-based composite film comprises a base film (100) having a first side (101) and a second side (102) and a functional layer (200), and an adhesive layer (500) is interposed between the display unit (400) and the polyamide-based composite film (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel displays an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the polyamide-based composite film (300). The adhesive layer may be an optically transparent adhesive layer, but it is not particularly limited.

The polyamide-based composite film (300) is disposed on the display unit (400). The polyamide-based composite film is located at the outermost position of the display device according to an embodiment to thereby protect the display unit.

The polyamide-based composite film (300) may comprise a base film and a functional layer. The functional layer may be at least one selected from the group consisting of a hard coating layer, a reflectance reducing layer, an antifouling layer, and an antiglare layer. The functional layer may be coated on at least one side of the base film.

The polyamide-based composite film according to an embodiment can be applied in the form of a film to the outside of a display device without changing the display driving method, the color filter inside the panel, or the laminated structure, thereby providing a display device having a wide angle of view and excellent visibility. Since neither significant process changes nor cost increases are needed, it is advantageous in that the production costs can be reduced.

The polyamide-based composite film (300) according to an embodiment is not only excellent in optical characteristics in terms of high transmittance, low haze, and low yellow index, but also excellent in mechanical characteristics in terms of excellent curl characteristics, high surface hardness, and low surface roughness.

In particular, the polyamide-based composite film (300) according to an embodiment produces a privacy protection effect at a wide angle of view (for example, 85°) as it exhibits a level of glossiness of the conventional polyamide-based films, while it exhibits a level of glossiness similar to that of glass at a main angle of view (for example, 20°), whereby it is possible to achieve excellent visibility and an aesthetic feeling similar to glass. Thus, it is suitable for use as a substitute film for glass.

As a result, since it is lightweight and excellent in flexibility as compared with glass and satisfies high surface hardness characteristics at the same time, it can be advantageously applied to a foldable display device or a flexible displace device.

EMBODIMENTS FOR CARRYING OUT THE INVENTION

Hereinafter, the present invention will be described in detail by referring to examples. But the following examples are intended to illustrate the present invention, and the scope of the present invention is not limited thereto only.

EXAMPLE

Example 1

A 1-liter glass reactor equipped with a temperature-controllable double jacket was charged with 779.1 g of dimethylacetamide (DMAc) as an organic solvent at 20° C. under a nitrogen atmosphere. Then, 0.2 mole of 2,2'-bis(trifluoromethyl)-4,4'-diaminobiphenyl (TFMB) was slowly added thereto for dissolution thereof. Subsequently, 0.006 mole of 2,2'-bis(3,4-dicarboxyphenyl)hexafluoropropane dianhydride (6-FDA) was slowly added thereto, and the mixture was stirred for 1 hour. Then, 0.15 mole of isophthaloyl chloride (IPC) was added, followed by stirring for 1 hour. And 0.0044 mole of terephthaloyl chloride (TPC) was added, followed by stirring for 1 hour, thereby preparing a polymer solution. Thereafter, 500 ppm of silica (average particle diameter: 100 nm to 150 nm) was added as a matting agent to the polymer solution thus prepared based on the total weight of the polyamide-based polymer, which was stirred.

The polymer solution thus obtained was coated onto a glass plate and then dried with hot air at 80° C. for 30 minutes. It was detached from the glass plate, fixed to a pin frame, and thermally treated with hot air in a temperature range of 80° C. to 300° C. at a temperature elevation rate of 2° C./min to obtain a polyamide-based film (or base film) having a thickness of 50 µm.

As to the contents of TFMB, 6-FDA, IPC, and TPC, the number of moles of the dianhydride compound and the dicarbonyl compounds based on 100 moles of the diamine compound is shown in Table 1.

A hard coating layer was formed on one side of the base film thus prepared. In order to form the hard coating layer, 54.32 parts by weight of a urethane acrylate oligomer (PU2050, Miwon Specialty Chemical), 23.28 parts by weight of a polyfunctional acrylate monomer (M300, Miwon Specialty Chemical), 19.4 parts by weight of a silica sol (MA-ST, Nissan Chemical) in which fine silica particles (average particle diameter: 10 nm to 15 nm) were dispersed in methanol at 30% by weight, and 3 parts by weight of a photoinitiator (I-184, BASF) were compounded with a stirrer to prepare a composition for forming a hard coating.

Thereafter, 100 parts by weight of methyl isobutyl ketone as a solvent was added thereto based on 100 parts by weight of the solids content of the composition for forming a hard coating, which was stirred and then applied to one side of the prepared polyamide-based film (or base film) by a die coating method. Thereafter, it passed through a drying chamber at 80° C. to dry the solvent for about 1 minute and then cured by irradiating an ultraviolet ray of a high-pressure mercury lamp at a light dose of 1,000 mJ/cm$^2$, thereby forming a coating film in a thickness of 5 µm. As a result, a polyamide-based composite film comprising a base film and a hard coating layer (or functional layer) was prepared. In addition, the content (ppm) of silica present in the prepared composite film is shown in Table 1 based on the total weight of the functional layer.

Examples 2 to 5 and Comparative Examples 1 and 2

Films were prepared in the same manner as in Example 1, except that the contents of the reactants and the like were changed as shown in Table 1 below.

EVALUATION EXAMPLE

The base films and polyamide-based composite films prepared in Examples 1 to 5 and Comparative Examples 1 and 2, along with conventional glass (Reference Example), were each measured and evaluated for the following properties. The results are shown in Table 1 below.

Evaluation Example 1: Measurement of Film Thickness

The thickness was measured at 5 points in the transverse direction using a digital micrometer 547-401 manufactured by Mitutoyo Corporation. Their average value was adopted as the thickness.

Evaluation Example 2: Measurement of Transmittance and Haze

The light transmittance and haze were measured using a haze meter NDH-5000W manufactured by Nippon Denshoku Kogyo in accordance with the JIS K 7105 standard.

Evaluation Example 3: Measurement of Yellow Index

The yellow Index (YI) was measured with a spectrophotometer (UltraScan PRO, Hunter Associates Laboratory) under the conditions of d65 and 10° in accordance with the ASTM-E313 standard.

Evaluation Example 4: Measurement of Surface Hardness

The pencil hardness was measured using a pencil hardness tester of Kipae ENT and Pressure-Proofed Hi-Density Lead Pencil of Mitsubishi Japan.

Specifically, after the polyamide-based composite film was prepared, the surface hardness of one side of the functional layer positioned opposite to the side in contact with the base film was measured. It was fixed to the glass substrate of the pencil hardness tester such that the functional layer faced upward, Mitsubishi pencil was installed at an angle of 45 degrees to the surface of the functional layer, the surface of the functional layer was scratched 5 times under a load of 750 g, and the presence or absence of scratches was observed to determine the hardness.

Evaluation Example 5: Evaluation of Curl

The polyamide-based composite films of the Examples and Comparative Examples were each cut to a size of 10 cm×10 cm, it was placed on a glass plate such that the base film was in contact with the glass plate (that is, the functional layer faced upward), and the height distanced from the 4 corners of the glass plate was measured at 25° C. and 50% RH. The average value thereof was obtained.

Evaluation Example 6: Measurement of Surface Roughness

The surface roughness was measured using AFM (atomic force microscopy) equipment.

Specifically, the model XE-150 of Park Systems was used, and the conditions were 1.0 Hz, scan area of 20 μm×20 μm, and non-contact cantilever PPP-NCHR 10M. After the polyamide-based composite film was prepared, the surface roughness of one side of the functional layer positioned opposite to the side in contact with the base film was measured.

Evaluation Example 7: Measurement of Glossiness

The glossiness was measured using VG-7000 equipment for a film sample of 20 mm×60 mm×50 μm according to the JIS Z 8741-1997 standard, in which the incident angle and the light receiving angle were the same. The incident angle was 20°, 60°, and 85°.

Specifically, after the polyamide-based composite film was prepared, the functional layer was brought into contact with the measuring unit of the glossiness meter, and the glossiness of the polyamide-based composite film was then measured.

TABLE 1

|  |  | Ex. 1 | Ex. 2 | Ex. 3 | Ex. 4 | Ex. 5 | C. Ex. 1 | C. Ex. 2 |
|---|---|---|---|---|---|---|---|---|
| Composition and thickness of base film | Diamine | TFMB 100 | TFMB 100 | TFMB 100 | TFMB 100 | TFMB 100 | TFMB 100 | TFMB 100 |
|  | Dianhydride | 6FDA 3 | 6FDA 3 | 6FDA 3 | 6FDA 3 | 6FDA3 | 6FDA3 | 6FDA 3 |
|  | Dicarbonyl compound | IPC 75 TPC 22 | IPC 75 TPC 22 | IPC 75 TPC 22 | IPC 75 TPC 22 | IPC 75 TPC 22 | IPC 75 TPC 22 | IPC 75 TPC 22 |
|  | Matting agent | Silica 500 ppm | Silica 500 ppm | Silica 500 ppm | Silica 500 ppm | Silica 500 ppm | Silica 50 ppm | Silica 50 ppm |
|  | Thickness (μm) | 50 | 50 | 50 | 50 | 50 | 50 | 50 |
| Composition and thickness of functional layer | A: PU2050 (7) + M300 (3) | 80 | 70 | 60 | 50 | 40 | 100 | 90 |
|  | B: MA-ST (silica sol) | 20 | 30 | 40 | 50 | 60 | 0 | 10 |
|  | Thickness (μm) | 5 | 5 | 5 | 5 | 5 | 5 | 5 |
|  | Content of silica (ppm) | 70,000 | 114,000 | 167,000 | 231,000 | 310,000 | 0 | 32,000 |

Regarding A in the composition of the functional layer, PU2050 and M300 were mixed at a weight ratio of 7:3.
Regarding the composition of the functional layer, A and B were mixed at the weight ratio shown in Table 1.
The content of silica refers to the content (ppm) contained based on the total weight of the functional layer.

TABLE 2

|  |  | Ex. 1 | Ex. 2 | Ex. 3 | Ex. 4 | Ex. 5 | C. Ex. 1 | C. Ex. 2 | R. Ex. Glass |
|---|---|---|---|---|---|---|---|---|---|
| Properties of base film | Haze (%) | 0.40 | 0.40 | 0.40 | 0.40 | 0.40 | 0.47 | 0.47 |  |
|  | Transmittance (%) | 89.1 | 89.1 | 89.1 | 89.1 | 89.1 | 89.1 | 89.1 |  |
|  | Yellow index | 2.95 | 2.95 | 2.95 | 2.95 | 2.95 | 2.65 | 2.65 |  |
| Properties of polyamide-based composite film | Transmittance (%) | 91.82 | 91.96 | 92.01 | 91.54 | 91.72 | 92.04 | 91.93 | 92.0 |
|  | Haze (%) | 0.42 | 0.40 | 0.41 | 0.39 | 0.42 | 0.38 | 0.41 | 0.51 |
|  | Surface hardness | 5 H | 5 H | 6 H | 6 H | 7 H | 4 H | 4 H | — |
|  | Evaluation of curl | 4 mm | 5 mm | 7 mm | 10 mm | 15 mm | 2 mm | 3 mm | — |
|  | Surface roughness (Ra) (μm) | 0.03 | 0.04 | 0.04 | 0.05 | 0.06 | 0.03 | 0.03 | 0.01 |
|  | $GL_{20}$ | 109 | 107 | 102 | 98 | 91 | 131 | 123 | 97.2 |
|  | $GL_{60}$ | 162 | 160 | 159 | 155 | 149 | 167 | 163 | 97.7 |
|  | $GL_{85}$ | 117 | 117 | 117 | 116 | 116 | 118 | 118 | 100 |
|  | $GL_{AVG}$ | 129.3 | 128 | 126 | 123 | 118.7 | 138.7 | 134.7 | 98.3 |
|  | Glossiness control value | 8 | 10 | 15 | 18 | 25 | −13 | −5 | 2.8 |

As can be seen from Tables 1 and 2 above, the polyamide-based composite films of Examples 1 to 5 satisfied a glossiness control value of 0 or more. Thus, it produces a privacy protection effect at a wide angle of view (i.e., an incidence angle of 85°) as it exhibits a level of glossiness that is not significantly different from that of the conventional polyamide-based films. It exhibits a level of glossiness similar to that of glass at a main angle of view (i.e., an incidence angle of 20°). Thus, it is possible to enhance the visibility and achieve an aesthetic feeling similar to glass.

Accordingly, the polyamide-based composite films of Examples 1 to 5 maintain the conventional visibility viewed from the lateral, thereby protecting privacy, while lowering the glossiness to increase the visibility when viewed from a main angle of view. Thus, it is readily applicable to a cover window for a display device and to a display device.

In addition, the polyamide-based composite films according to the Examples showed an average height of the four corners of 15 mm or less in the evaluation of curl and a surface hardness of 5H or higher, indicating excellent curl characteristics and mechanical properties.

Further, the polyamide-based composite films according to the Examples contained a specific amount of a matting agent having a specific particle size in the base film, which increased the surface area of the base film, thereby making easy to coat the composition for forming a functional layer. In addition, since the compatibility of the base film and the functional layer was excellent, it was possible to achieve a polyamide-based composite film having enhanced durability such as detachment resistance.

In contrast, the polyamide-based composite films of Comparative Examples 1 and 2 had a particularly high value of glossiness at 20° from the viewpoint of glossiness. When the film was viewed from a main angle of view, light reflection took place severely, resulting in poor visibility and fatigue to the eyes. Thus, it was not suitable for use as a substitute film for glass.

EXPLANATION OF REFERENCE NUMERALS

10: polymerization apparatus
20: tank
30: belt
40: thermosetting device
50: winder
100: base film
101: first side
102: second side
200: functional layer
300: polyamide-based composite film
400: display unit
500: adhesive layer

The invention claimed is:

1. A polyamide-based composite film, which comprises a base film comprising a polyamide-based polymer; and a functional layer disposed on the base film, and which has an average glossiness ($GL_{AVG}$) of 90 to 130, which is an average value of the glossiness at 20° ($GL_{20}$), a glossiness at 60° ($GL_{60}$), and the glossiness at 85° ($GL_{85}$), wherein the glossiness at 60° ($GL_{60}$) is glossiness measured according to the JIS Z 8741-1997 standard with the polyamide-based composite film at an incident angle of 60°, wherein a glossiness control value of the polyamide-based composite film according to the following Equation 1 is 0 or more:

Glossiness control value=glossiness at 85°($GL_{85}$)− glossiness at 20°($GL_{20}$)  [Equation 1]

wherein, in Equation 1, the glossiness at 85° ($GL_{85}$) is glossiness measured according to the JIS Z 8741-1997 standard with the polyamide-based composite film at an incident angle of and the glossiness at 20° ($GL_{20}$) is glossiness measured according to the JIS Z 8741-1997 standard with the polyamide-based composite film at an incident angle of 20°.

2. The polyamide-based composite film of claim 1, wherein the glossiness at 20° ($GL_{20}$) is 80 to 120, and the glossiness at 85° ($GL_{85}$) is 90 to 117.

3. The polyamide-based composite film of claim 1, wherein a surface hardness of one side of the functional layer positioned opposite to the side in contact with the base film is 5H or higher.

4. The polyamide-based composite film of claim 1, wherein a surface roughness (Ra) of one side of the functional layer positioned opposite to the side in contact with the base film is 0.06 μm or lower.

5. The polyamide-based composite film of claim 1, wherein the base film further comprises a matting agent.

6. The polyamide-based composite film of claim 5, wherein the matting agent is at least one selected from the group consisting of silica, poly(methyl methacrylate), poly(butyl methacrylate), polystyrene, melamine, silicone, barium sulfate, and glass.

7. The polyamide-based composite film of claim 5, wherein the content of the matting agent is 100 to 3,000 ppm based on the total weight of the polyamide-based polymer.

8. The polyamide-based composite film of claim 1, wherein the polyamide-based polymer comprises a repeat unit represented by the following Formula A and a repeat unit represented by the following Formula B at a molar ratio of 0:100 to 50:50:

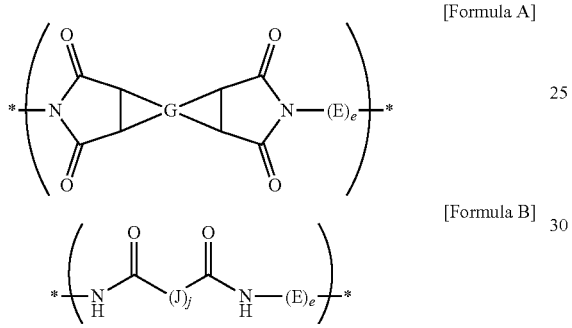

[Formula A]

[Formula B]

wherein E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, G is a group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group is present alone, is fused to each other to form a condensed ring, or is bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

9. The polyamide-based composite film of claim 1, wherein the functional layer further comprises a filler, the content of the filler is 50,000 ppm to 400,000 ppm based on the total weight of the functional layer, and the filler has an average particle diameter of 5 nm to 100 nm.

10. The polyamide-based composite film of claim 1, which has a haze of 1% or less, and a transmittance of 80% or more.

11. A display device, which comprises a display unit; and a polyamide-based composite film disposed on the display unit, wherein the polyamide-based composite film comprises a base film comprising a polyamide-based polymer; and a functional layer disposed on the base film, wherein the polyamide-based composite film has an average glossiness ($GL_{AVG}$) of 90 to 130, which is an average value of the glossiness at 20° ($GL_{20}$), a glossiness at 60° ($GL_{60}$), and the glossiness at 85° ($GL_{85}$), wherein the glossiness at 60° ($GL_{60}$) is glossiness measured according to the JIS Z 8741-1997 standard with the polyamide-based composite film at an incident angle of 60°, and wherein a glossiness control value of the polyamide-based composite film according to the following Equation 1 is 0 or more:

Glossiness control value=glossiness at 85°($GL_{85}$)−glossiness at 20°($GL_{20}$)  [Equation 1]

wherein, in Equation 1, the glossiness at 85° ($GL_{85}$) is glossiness measured according to the JIS Z 8741-1997 standard with the polyamide-based composite film at an incident angle of 85°, and the glossiness at 20° ($GL_{20}$) is glossiness measured according to the JIS Z 8741-1997 standard with the polyamide-based composite film at an incident angle of 20°.

* * * * *